United States Patent [19]
Barnes

[11] Patent Number: 5,596,320
[45] Date of Patent: Jan. 21, 1997

[54] SYSTEM FOR DETECTION OF ICE, WATER, GLYCOL SOLUTION, AND OTHER CHEMICAL SPECIES

[75] Inventor: Clarence W. Barnes, San Francisco, Calif.

[73] Assignee: Optical Sensor Consultants Inc., Lexington, Mass.

[21] Appl. No.: 431,487

[22] Filed: Apr. 28, 1995

[51] Int. Cl.⁶ .................................................. G08B 19/02
[52] U.S. Cl. ...................... 340/962; 250/574; 250/578.1; 340/583; 340/604; 356/136
[58] Field of Search ...................... 340/583, 604, 340/962; 356/136; 250/578.1, 574

[56] References Cited

U.S. PATENT DOCUMENTS

| 4,851,817 | 7/1989 | Brossia et al. | 340/583 |
| 4,913,519 | 4/1990 | Klainer et al. | 385/12 |
| 5,014,042 | 5/1991 | Michoud et al. | 340/583 |
| 5,083,018 | 1/1992 | Rhyne | 250/227.25 |
| 5,396,325 | 3/1995 | Carome et al. | 356/128 |

*Primary Examiner*—Glen Swann
*Attorney, Agent, or Firm*—Henry P. Sartorio

[57] ABSTRACT

Ice in particular and also other substances such as water and glycol-containing anti-icing fluids can be detected and distinguished by means of differences in their optical index of refraction. A plurality of beams at different angles of incidence are multiplexed onto the reverse side of an optical surface which is embedded in a surface to be monitored or otherwise positioned in a sampling environment. The reflected beams at the different angles are measured and refractive indexes calulated form the measured reflected beams. If the calculated refractive indexes are the same at all angles, then the substance is positively identified. If the values do not agree, then there is partial coverage, and the substance may be identified by comparison with predetermined values. The system is applicable to aircraft, where in-flight and pre-flight monitoring of icing conditions and surface contamination is needed.

23 Claims, 6 Drawing Sheets

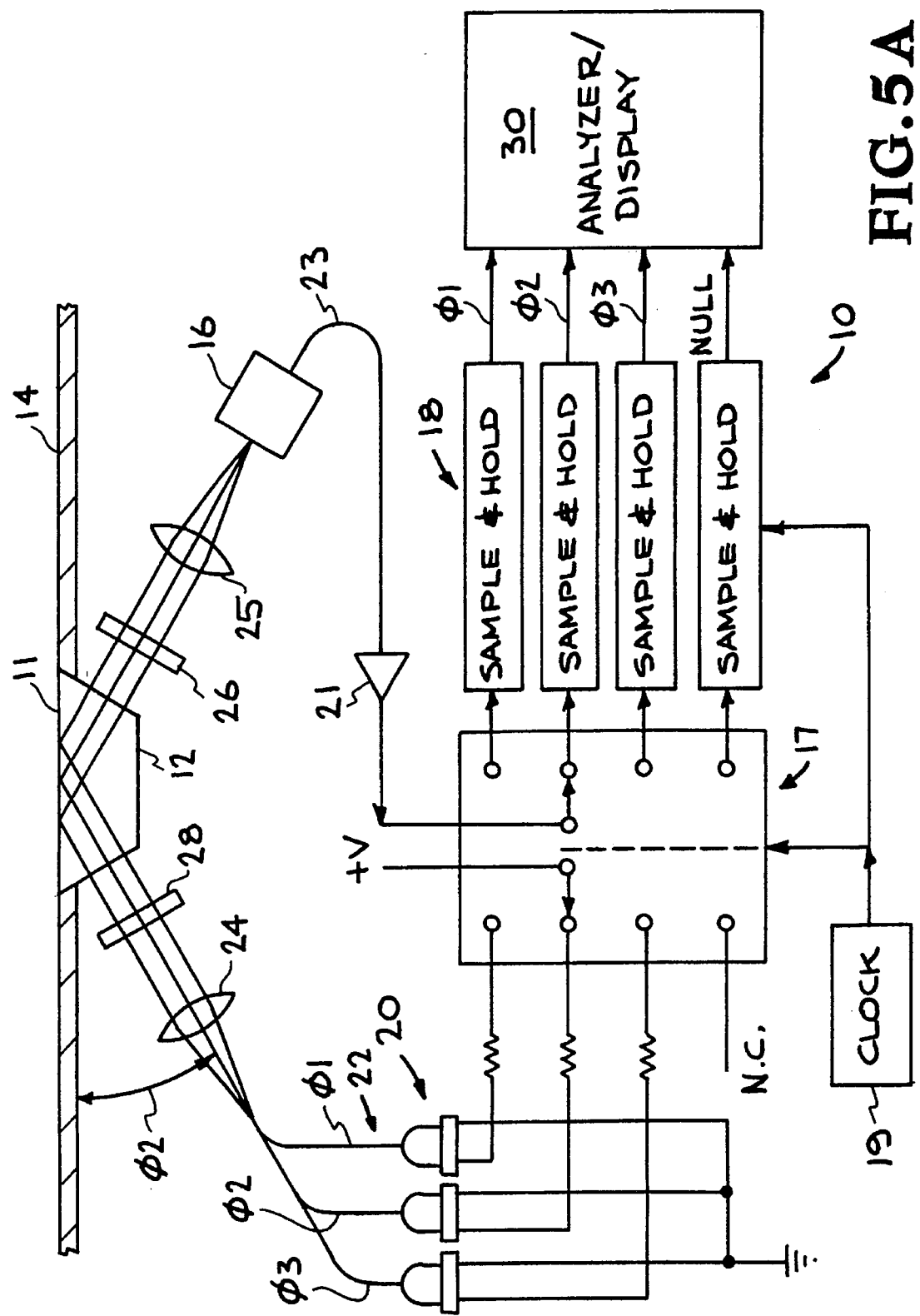

5,596,320

SYSTEM FOR DETECTION OF ICE, WATER, GLYCOL SOLUTION, AND OTHER CHEMICAL SPECIES

BACKGROUND OF THE INVENTION

The invention relates generally to optical detection of chemical species, and more particularly to optical detection of chemical species by refractive index.

A particular problem of great concern in the aviation industry is the ability to detect aircraft icing. In recent years there have been a number of airplane crashes attributed to icing problems.

Optical detection, based on the unique optical properties of materials, is often highly advantageous. In particular optical detection schemes based on refractive index are often useful. There are several technologies for ice detection based on refractive index.

U.S. Pat. No. 4,851,817 issued Jul. 25, 1989 to Brossia et al describes a system for detecting water and icing on surfaces wherein changes in transmission of light through an optical fiber are produced by exposing a portion of the fiber to ambient conditions. The difference of refractive indexes between air, water and ice which contact the exposed portion changes the transmission properties of the fiber.

U.S. Pat. No. 4,913,519 issued Apr. 3, 1990 to Klainer et al describes an ice sensor based on differences in refractive index. A fiber optic or other waveguide is formed with spaced stripes of a clad material having an index close to ice with the core having an index less than water. When ice fills the gaps between the clad stripes, light is totally internally reflected by the clad, but when water or other materials having a greater refractive index fill the gaps, light is lost through the gaps and transmission through the fiber or waveguide is diminished.

U.S. Pat. No. 5,014,042 issued May 7, 1991 to Michoud et al describes a system in which light is transmitted through an optical channel having a prism with two plane faces at 90° to each other forming an interface with the external environment. Light is incident at 45° to one of the faces. If the external environment is air, the light is totally internally reflected towards the other face and back through the channel to a receiver. If water or ice is present at the interface, the light is refracted out of the prism, reducing or eliminating light transmission through the channel. The prism extends 7 cm out of the fuselage at the nose so that air flow causes rain to modulate the light transmission.

However the prior art for ice detection has many deficiencies. For example, the method of Klainer is vulnerable to contamination that can irreversibly fill the grooves allowing ice to form outside the sensing region and lead to a false negative reading. Michoud can only distinguish ice from water when the aircraft is moving. In addition, none of the systems can easily identify different substances of different refractive indexes. Consequently, a better ice detection system is sought.

SUMMARY OF THE INVENTION

Accordingly it is an object of the invention to provide an improved optical sensor and method for detecting ice, water, glycol solution and other chemical species.

It is a further object of the invention to provide an improved method and apparatus for optical detection based on refractive index.

The invention is a method and apparatus for detecting ice, water, glycol solution and other chemical species using internal reflectance and angle multiplexing. An optical surface, e.g. of a prism, is embedded flush with a surface at which the presence of various chemical species, e.g. water, ice, glycol solution, is to be detected, or the optical surface can otherwise be positioned in a sampling environment. The optical surface forms a reflecting and refracting interface with the environment to be monitored. A plurality of light beams, each at a different angle of incidence, are sequentially multiplexed onto the optical surface from the reverse side to the exposed side. The angles of incidence of the beams are chosen on the basis of the refractive indexes of the chemical species to be detected. The amount of each beam internally reflected is measured. The refractive index of the chemical species is determined from the Fresnel equations. By making multiple measurements at different angles, inconsistent values are eliminated, and the correct refractive index can be determined.

Advantages of the method include the following:

(1) Thin layers (<1mm) of substances such as ice, water, etc., can be detected and accurately distinguished from one another.

(2) The sensor can be flush-mounted, with a smooth, non-protruding surface.

(3) The device has no moving parts.

(4) Although the sensor is optical, high ambient light levels can be tolerated.

(5) The system is capable of self-diagnosis to detect problems such as damaged or degraded optics and extreme ambient light levels.

(6) In the case of partial or non-uniform coverage by discrete patches of different substances (e.g., air, ice crystals, water droplets) it is generally possible to infer (by means of an attached microcomputer) what substances are actually present.

(7) Other types of complex sensor coverage conditions (e.g., a thin layer of water under ice) can be effectively analyzed by means of alternate mathematical models embodied in software.

(8) If the analyses described in (6) and (7) should fail, the system can in general return an indication of this failure rather than deliver a false result.

BRIEF DESCRIPTION OF THE DRAWINGS

FIG. 5A is a diagram of the apparatus using refraction/internal reflectance and angle multiplexing.

DETAILED DESCRIPTION OF THE PREFERRED EMBODIMENTS

THEORY OF OPERATION

Figure 1:
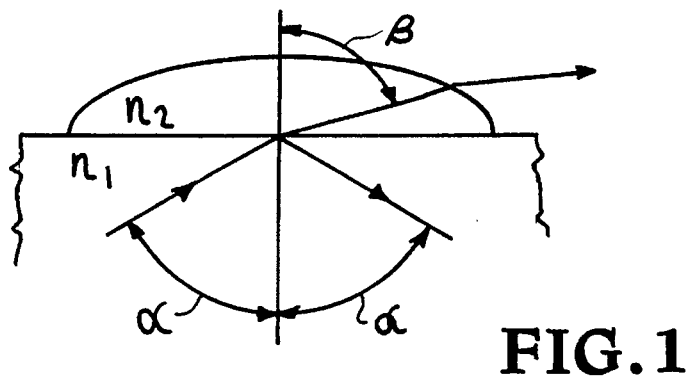
FIG. 1 illustrates the reflection and refraction of a light beam at the interface between two media.

The phenomenon of total internal reflectance (TIR) is a well-known optical effect wherein, under suitable conditions, a beam of light propagating in a medium of index of refraction $n_1$ is completely reflected at the boundary where the index of refraction becomes $n_2$. FIG. 1 illustrates the reflection and refraction of a light beam at the interface between media of indexes $n_1$ and $n_2$ where $n_2 < n_1$. The angle of incidence and reflection is $\alpha$ and the angle of refraction is $\beta$. The critical angle of incidence for TIR is related to the refractive indexes $n_2$ and $n_1$ by $$\alpha_{crit} = \operatorname{Sin}^{-1} \frac{n_2}{n_1} \qquad \text{(Eq. 1)}$$

Similarly, for a given angle of incidence $\alpha$ the critical index of refraction in the second medium is give by $$n_{2crit} = n_1 \sin\alpha \qquad \text{(Eq.2)}$$

For values of $n_2$ less than $n_{2crit}$, the beam is internally reflected, i.e. reflectance=R=1.

The principle of optical TIR has been used for the accurate measurement of the index of refraction for liquids, gases, and solids. Instruments typically use a variable angle of incidence $\alpha$ to find the critical angle $\alpha^{crit}$ at which the reflectance just begins to fall from 1. The index of refraction $n_2$ can then be calculated from Eq. 1. Laboratory instruments using this principle generally use a nearly monochromatic light source, and great care is used in setting angles, minimizing scatter, controlling collimation, etc.

However, a different principle is used in the present invention. For $n_2$ values exceeding $n_2^{crit}$, part of the incident beam leaves the $n_1$ medium by refraction into the $n_2$ medium, i.e. TIR ceases to occur. Reflectance R is no longer equal to 1, but is instead given by the well-known Fresnel equations:

$$R\perp = \frac{\operatorname{Sin}^2(\alpha - \beta)}{\operatorname{Sin}^2(\alpha + \beta)} \qquad \text{(Eq. 3)}$$

$$R\| = \frac{\tan^2(\alpha - \beta)}{\tan^2(\alpha + \beta)} \qquad \text{(Eq. 4)}$$

where $\beta$=angle of refraction, given by Snell's law:.

$$\frac{\operatorname{Sin}\beta}{\operatorname{Sin}\alpha} = \frac{n_1}{n_2} \qquad \text{(Eq. 5)}$$

$R\perp$, $R\|$, are the reflectance for the two linear polarization states of the incident beam, with the electric vector respectively perpendicular and parallel to the plane of incidence. In the case of unpolarized light, the effective reflectance is the mean of $R\perp$ and $R\|$ as given above. Ref: M. Born and E. Wolf, *Principles of Optics*, 6th Edition, I.5.3, Pergamon, 1980.

Instead of tuning the angle of incidence to find $\alpha^{crit}$ it is possible to determine $n_2$ by measurement of the Fresnel reflectance at some angle $\alpha$ less than $\alpha^{crit}$. This requires solution of the inverse problem: given reflectance R, and angle $\alpha$, find $n_2$. The computation involves the solution of transcendental equations involving trigonometric functions, but this is not a serious obstacle in view of the current capabilities of microprocessors and numerical data storage chips.

According to the invention, a prism or other optical element having a reflecting/refracting surface is mounted in a surface to be monitored with the reflective/refractive surface flush therewith or otherwise positioned in a sampling environment. The surface forms a reflecting/refractive interface with the environment. The reflection of light beams incident on the reverse side of the reflecting/refracting surface, i.e. the amount of light that is internally reflected at the interface, is measured.

Figure 2:
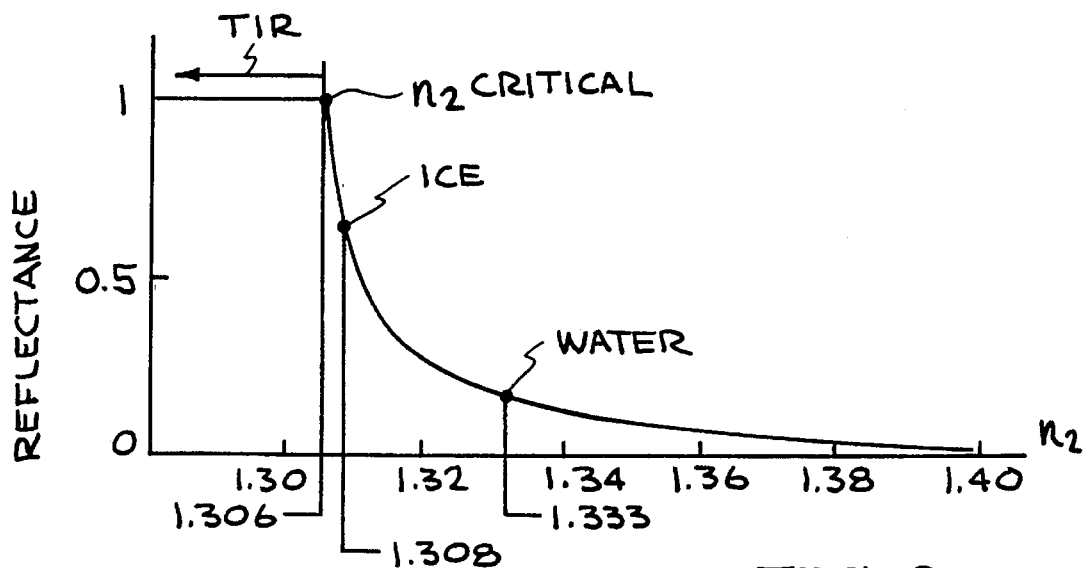
FIG. 2 shows reflectance as a function of $n_2$ for an unpolarized beam with $\emptyset=61°$ and $n_1=1.4932$.

FIG. 2 shows a plot of reflectance versus $n_2$ for an unpolarized beam, $\alpha=61°$, $n_1=1.4932$, using the above e FIG. 2 the critical index for TIR is $n_2=1.306$, just slightly less than $n_2$ for ice. When only air is present, the TIR regime operates and reflectance =1. If the prism surface is covered with ice, having $n_2=1.308$, the reflectance falls to 0.63. If the prism is covered with water, $n_2=1.333$, the reflectance is 0.17. For pure glycol, with $n_2=1.433$, reflectance drops to 0.007. Therefore reflectance measurements at this one angle can easily distinguish these four cases.

If the prism were always to be completely covered with a single homogeneous substance (air or ice or water, etc.) only a single beam, at an appropriate angle of incidence, would be needed. But if partial coverage of the prism occurred, an erroneous $n_2$ measurement would result; for example, if the prism were only 45% covered by water, the apparent reflectance would be about 0.63 and the substance would be misidentified as ice (using the system parameters as in FIG. 2).

A reliable system for ice detection should not misidentify the material on the sensor surface in the case of partial coverage. At the very least, the system should be able to detect the problem and return a "failure to identify" signal.

This can be achieved by using multiple light beams, at slightly different angles of incidence. In the above example, a 45% coverage by water will cause a sensor channel at $\alpha=61°$ to record a reflectance close to that for ice. But if there is a second channel, operating at 62.5°, it will record a reflectance value that cannot be attributed to ice. With several channels available at different angles of incidence, a value for $n_2$ can be computed from the reflectance at each angle. If the prism surface is only partly covered (with ice, water, etc.) the $n_2$ values will not agree. Thus partial coverage can be detected.

Figure 3:
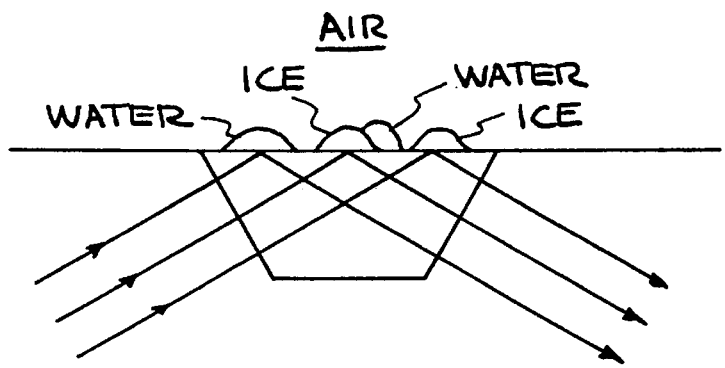
FIG. 3 illustrates mosaic coverage.

Moreover, it is even possible, under some conditions, to compute what substances are present when multiple substances are present in discrete patches on the prism surface. This case, which may be called "mosaic coverage", is depicted in FIG. 3. It turns out that, under suitable conditions, coverage coefficients for a panel of various substance such as air, ice, water, glycol, etc. can be calculated from the reflectances at the various angles of incidence. The mathematical details of this approach are discussed herein.

Figure 4:
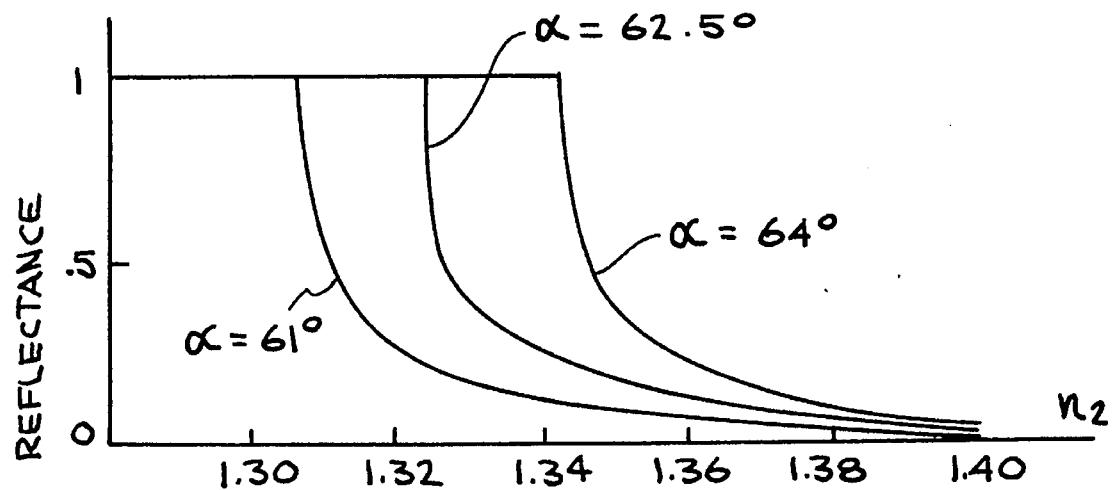
FIG. 4 illustrates reflectance vs. $n_2$ for three different angles of incidence and $n_1=1.4932$.
Figure 6:
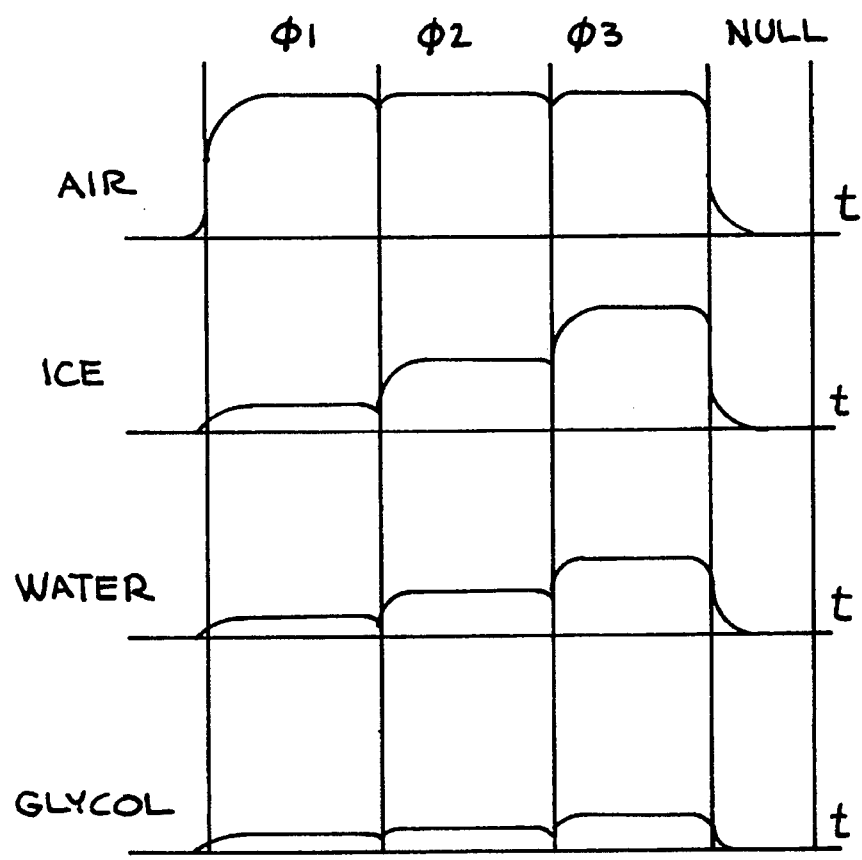
FIG. 6 is a graph of detected signals for various angles of incidence and for various substances covering the prism.

The reflectance at the different angles of incidence provide a kind of "signature" for the substance (or substances) present on the prism surface. FIG. 6 depicts typical signatures for air, ice, water, and glycol using three angles. Exact analysis will involve computation (or retrieval from a "look-up" table) of $n_2$ values from each measured reflectance. This determination of $n_2$ will be possible only when the reflectance is neither very close to 1 nor to 0, since, as in evident from FIG. 4, at these extremes the relation between n2 and reflectance becomes multifold. FIG. 4 shows reflectance vs. $n_2$ for $n_1=1.4932$ at three angles of incidence $\alpha=61°$, 62.5°, 64°. The computational details involved in reaching a decision as to what substance or substances are present are discussed below.

In considering the various kinds of prism coverage situations that might occur and their optical "signatures", it is convenient to make use of a matrix algebra formulation in which the instantaneous data from the sensor is represented by a column matrix containing the reflectance at each different angle of incidence. Thus in the system described herein (with three angles of incidence) the instantaneous reflectance data is embodied in a 3×1 column matrix denoted by $\vec{R}$, the data vector. ($\vec{R}$ is a "vector" only in a formal sense; it does not have physical significance as a vector.)

Each model to be considered (e.g., the mosaic-coverage model) is to be represented by a 3×3 matrix A. The model "predicts" that data $\vec{R}$ if there is some plausible detailed coverage situation, described by another 3×1 column matrix $\vec{X}$, such that $_{A\vec{X}}$. To test the degree to which the model agrees with the data, the inverse computation $\vec{X}=A^{-1}\vec{R}$ is performed and the resulting $\vec{X}$ is tested to see if the result is reasonable according to criteria derived from the model and expressed as a constraint equation for $\vec{X}$.

For small A matrices, in particular for the 3×3 matrices considered here, the $\vec{X}=A^{-1}\vec{R}$ formulation is also computationally convenient and efficient in real-time analysis of the data stream. The microcomputer attached to the sensor may hold in its memory dozens of different A matrices corresponding to different coverage models. Floating-point computation of matrix inversion and multiplication can be accomplished rapidly to select a best-fit model for $\vec{R}$.

In summary, the advantages of using multiple beams at different angles of incidence, are as follows:

(1) The range of $n_2$ values which can be directly calculated from reflectance is increased. See FIG. 4.

(2) In the case of complete prism coverage by a single homogeneous substance, the calculated $n_2$ values are redundant. This provides a method for ascertaining that such coverage is in fact occurring.

(3) When coverage of the prism is of the "mosaic" kind, it is nevertheless possible, in many cases, to use the reflectance data to determine what substances are present in so far as these substances are characterized by different values for their index of refraction.

(4) Detection of other kinds of complex sensor coverage conditions (e.g., a thin layer of water under ice) can be accomplished by means of alternate mathematical models embodied in software.

(5) The presence of unusual substances which would otherwise cause a misidentification can often be detected; thus, the sensor can return a "failure to identify" signal rather than a false identification.

DESCRIPTION OF DEVICE

I. Hardware

FIG. 5A shows a system 10 using three incident angles $\alpha=\emptyset_1$, $\emptyset_2$, $\emptyset_3$ (e.g., 61°, 62.5°, 64°) to determine the presence of ice, water or glycol solution or other substances with index of refraction in the range $1.306<n_2<1.37$. If more concentrated glycol solutions than about 40% are to be detected, an additional beam at a greater angle of incidence may be needed. The beams are incident onto surface 11 of prism 12 which is embedded into a surface 14 with surface 11 flush with surface 14. Surface 14 is any surface to be monitored, e.g. an aircraft wing. Surface 11 need not be flush with surface 14 or even mounted in a surface 14; prism 12 could be merely positioned in a sampling environment.

Figure 5B:
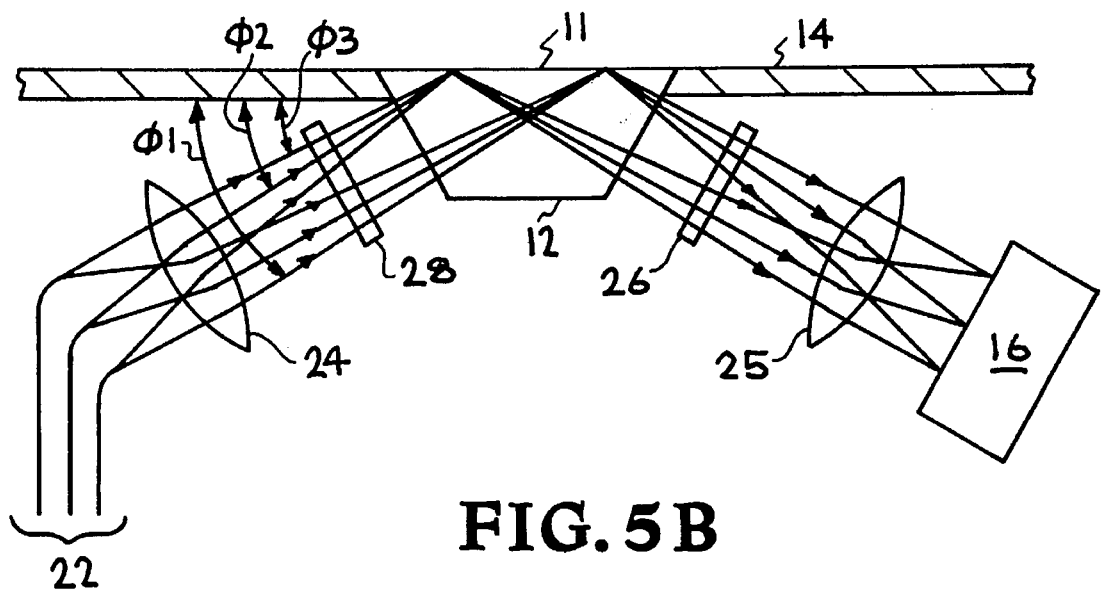
FIG. 5B is a detailed view of the angle multiplexed beams.

FIG. 5A illustrates the beam at $\emptyset_2$. FIG. 5B shows all three beam angles $\emptyset_1$, $\emptyset_2$, $\emptyset_3$ overlayed (although in operation only one beam is present at a time) to show the different angles.

The system 10 uses "angle multiplexing", wherein the three beams, at angles $\emptyset_1$, $\emptyset_2$, $\emptyset_3$, are sequentially switched on, and the corresponding signal from a single photodetector 16 is recorded. A fourth time-segment of the cycle is also provided during which all of the beams are shut off. This provides a null signal which, ideally, would be zero, but which is likely to have a non-zero value due to ambient light entering the sensor. (Which may occur from small surface abrasions of the prism, in strong sunlight.) The signal from the null channel (N.C.) will be subtracted from the signal from each of the three beam channels, to correct for extraneous light. A multiplexer 17 which is operated by clock 19 sequentially applies a voltage +V to three LEDs 20. The output of photodetector 16 is a measure of the amount of the light beam reflected at surface 11. The output of photodetector 16 is amplified by amplifier 21 and passes to multiplexer 17 where it is output to one of three sample and hold (S/H) circuits 18 corresponding to a respective LED 20. A fourth S/H circuit 18 represents the null channel (N.C.). The device operates in a continuous cycle, typically at a rate of several hundred repetitions per second, and signals are held in the analog sample-and-hold circuits 18.

Figure 5C:
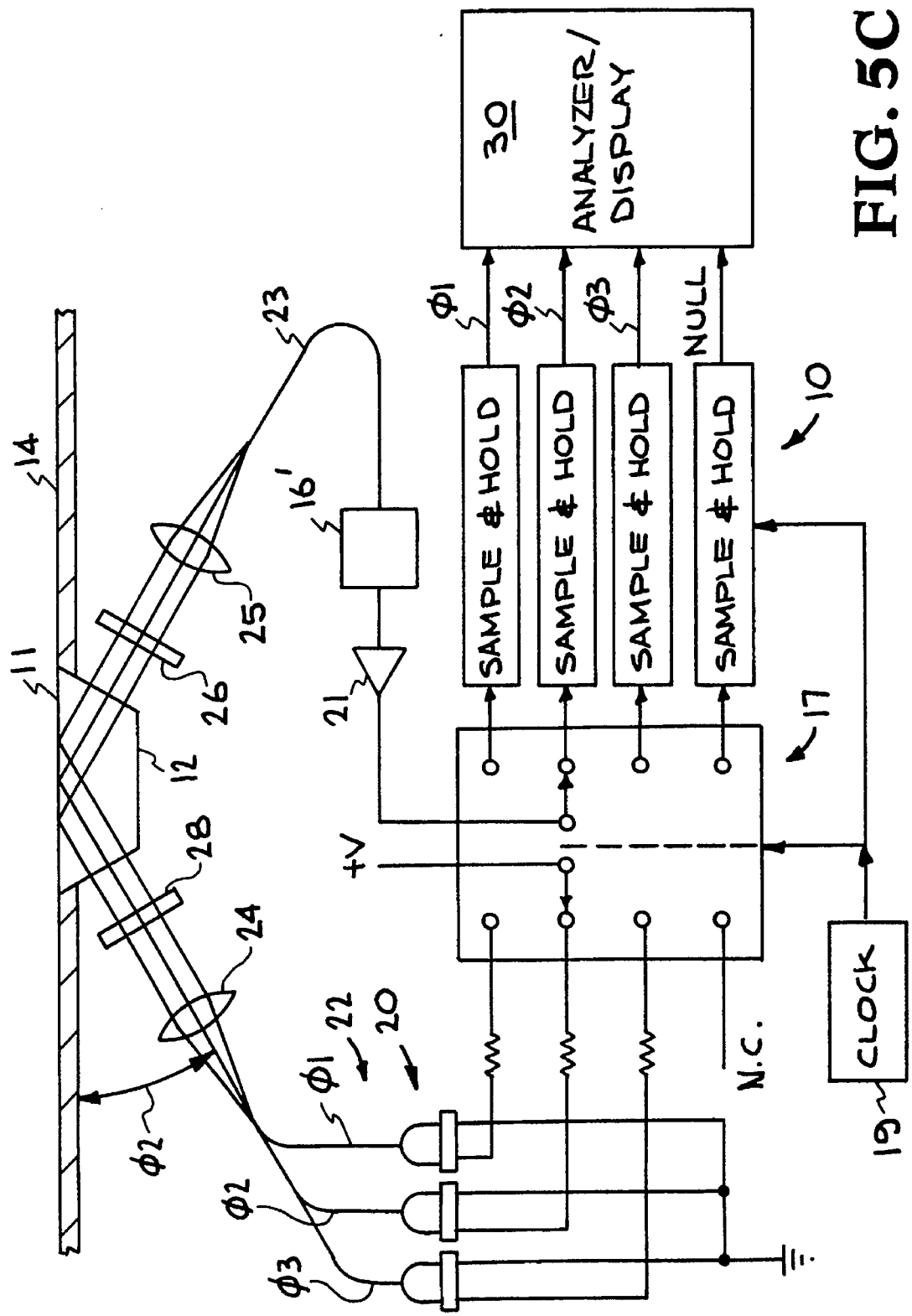
FIG. 5C is a diagram of an alternate embodiment of the apparatus.

In FIG. 5A the light beams are derived from 3 LED's 20 each of which is fitted with a short fiber optic 22 that delivers light to the focal plane of a first lens 24. The lens 24 delivers well-collimated beams to the inner surface of the prism 12, at $\emptyset$ angles corresponding to the placement of each fiber optic end relative to the optical axis of the lens 24. The degree of collimation is determined by the diameter of the fiber optic core and, to a lesser degree, by diffraction effects in the lens system. For a 200 µm core fiber and a two inch focal length lens, collimation tolerance is on the order of 0.1°. The lens 25 focuses the reflected light beams onto detector 16. Alternatively, as shown in FIG. 5C, a remote detector 16' can be used, where cable 23 is a fiber optic cable which receives the reflected light beams and transmits the light beams to detector 16'.

The filters and polarizers shown have as their principal function the blocking of extraneous light. A band pass filter 26 in front of the detector 16, admitting only light in a narrow band of wavelengths around the LED wavelength, will greatly reduce the amount of spurious light reaching the detector. Polarizers 28 can also assist in achieving insensitivity to extraneous light. Polarizers may also be used to enhance sensitivity, by selection of optimum polarization modes, or to detect crystalline materials, such as ice.

Hardware for the analysis module 30 would consist, first of all, of analog or digital circuitry to subtract the null-channel signal from each of the three signals, in order to correct for the presence of extraneous light. Each of the corrected signals would then be digitized and held in data registers for analysis by microprocessor. Module 30 can also include a display.

FIG. 6 shows the amplified photodetector signals (at point P of FIG. 5A) for the three angles for various substances covering the prism.

II. Algorithms/Software

Figure 7:
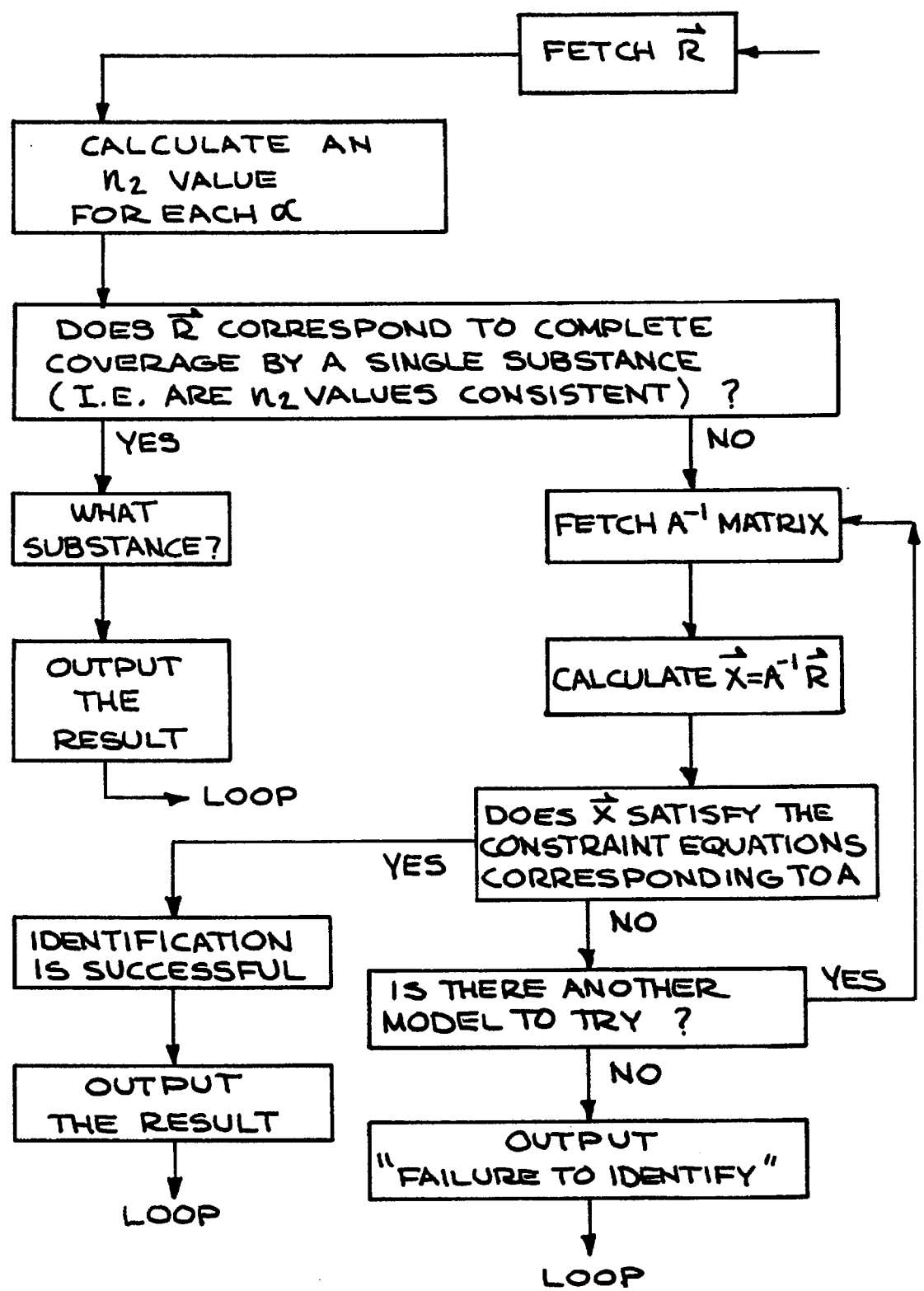
FIG. 7 is a computational flowchart.

FIG. 7 shows a flow chart that would be embodied in the analysis module. It includes the computations pertaining to "mosaic coverage" as discussed herein.

The main branch point in the decision tree shown in FIG. 7 is in the answer to the question "Do the computed values for $n_2$ derived from the three reflectance values at the different angles all agree?" If the answer is Yes, then it is established that there is uniform coverage by a homogeneous substance of index $n_2$. Identification proceeds by consulting a look-up table, e.g. if the result is $n_2=1.344$, it can be inferred that coverage is by a 11% glycol solution. If the main branch point returns a No answer, a branch occurs to the mosaic coverage segment of the program. In this segment, one or more panels of substances which may be present (e.g., air, ice, water, glycol) are stored in memory in the form of $A^{-1}$ matrices (See IIA below). The algorithm uses each $A^{-1}$ matrix to compute a trial vector $\vec{X}$ of coverage coefficients from the observed reflectance. If the components of $\vec{X}$ are found to satisfy two conditions, the identification is assumed to be successful. If the conditions are not satisfied, a new panel with a new $A^{-1}$ is selected, and the test is repeated. If none of the panels provides a satisfactory set of coverage coefficients, a "failure to identify" signal is returned.

IIA. Mosaic Coverage by Several Different Substances

In some cases the set of values for $n_2$ calculated from the corresponding reflectances at the angles $\alpha_1 \ldots \alpha_j$ will not agree. This can occur if the material covering the prism is not spatially homogeneous, as in FIG. 3. For example, there may be droplets of water at some points of the surface, and air at the other points. Or there may be a mosaic of air, water, and ice on the surface, as in FIG. 3, with droplets of glycol present. These cases are referred to as "mosaic coverage", and this coverage is described by a set of numbers $X_1 \ldots X_j$ giving surface coverage fractions for each of the substances that might be present. The number of possible substances is assumed to be equal to j, the number of angles at which reflectance is measured. This makes the number of unknown $X_i$ just equal to the number of equations give by the reflectance data.

Assuming that all optical radiation that enters $n_2$ by refraction from the prism is lost, i.e., does not re-enter the system by scattering or by reflection from the air interface (a possibility to be discussed in IIB below), then the $X_i$ coverage coefficients must each be positive, $0 < X_i < 1$, and they must sum to 1:

$$\sum_{i=1}^{j} X_i = 1$$

The conditions under which $X_i$ are determined by the reflectance are as follows:

(1) The number of substances in the basis set do not exceed the number of different angles at which reflectance is measured (for otherwise there are more unknowns than equations.)

(2) The basis substances are each characterized by a different index of refraction.

(3) The angles $\alpha_1, \ldots \alpha_j$ at which reflectance is measured are chosen to cover the range of interest of index of refraction values. That is, for $n_2$ value of a basis substance there is at least one $\alpha_i$ in the set which provides a satisfactory intersection with the reflectance curve. "Satisfactory" here means that the reflectance value for the given $n_2$ is neither very close to 1 nor to 0. This insures that the Fresnel equations can be solved for $n_2$ from the observed reflectance.

(4) The coverage pattern must meet certain micro-structural conditions. Most importantly, the micro-domains making up each phase may not be too small, or else the optical characteristics of the reflected light are no longer describable by the Fresnel equations or the TIR equations. That some such limitation must hold is evident since if the domains were to be as small as molecular dimensions, the optical properties of the layer would approach that of a solution having a single index of refraction intermediate between those of the two components. At a larger scale of sizes for the domains, on the order of light wavelengths, optical scattering phenomena involving the evanescent wave may operate to give anomalous reflectance. However, such effects should be negligible for mosaic domains no smaller than 1 mm or so.

Let $r_{ik}$=reflectance at angle $\alpha_i$ for complete coverage by substance k. Combine $r_{ik}$ for a given substance k into a "Reflectance vector" $\vec{r}_k$:

$$\vec{r}_k = \begin{bmatrix} r_{1k} \\ . \\ . \\ . \\ r_{jk} \end{bmatrix}$$

It follows from the above condition, and from the fact that the reflectance curves (as in FIG. 4) are monotonic and non-intersecting in the region of interest, that the j reflectance vectors $\vec{r}_k$ are all different, and, in fact, form a linearly independent set. This linear independence makes it possible to calculate the $\vec{X}$ coverage coefficients from a set of reflectance measurements. Let $R_i$=observed reflectance at angle $\alpha_i$. Then, $R_i$ is a weighted sum over the reflectances of the various substances that may be present in the mosaic, with the weighting factors being the coverage coefficients. That is, $$R_i = X_1 r_{i1} + \ldots + X_j r_{ij}$$

There are j such equations, and their simultaneous solution for the $X_i$ is best represented in matrix formalism. The whole set of equations corresponds to the single matrix equation $$\vec{R} = A\vec{X}$$

where the jxj square matrix A is formed from the column matrices that make up the $\vec{r}_k$ $$\vec{X} = \begin{bmatrix} X_1 \\ . \\ . \\ . \\ X_j \end{bmatrix} \text{ and } A = \begin{bmatrix} r_{11} & . & . & . & r_{1j} \\ . & & & & . \\ . & & & & . \\ . & & & & . \\ r_{j1} & . & . & . & r_{jj} \end{bmatrix}$$

Formally the solution is $$\vec{X} = A^{-1}\vec{R}$$

Given the stated conditions, the inverse matrix $A^{-1}$ exists and the components for $\vec{X}$ are calculable.

The components of $\vec{X}$ should all be between 1 and 0 and should sum to 1. If this should be found not to be the case, it means that one or more of the conditions are failing to hold. E.g., if some extraneous substance not represented by an $\vec{r}_k$ is actually present, and if it has an $n_2$ value different from that of any of the j basis substances, than the calculated $\vec{X}$ will fail to satisfy the requirements.

IIB. Other Complex Prism Coverage Conditions-Thin Films and Contaminants

The mosaic-coverage analysis has explicitly assumed:

(1) That all of the light that is refracted into the $n_2$ layer is lost, i.e., that none of the refracted light re-enters the system by scattering or by secondary reflections at the $n_2$/air interface, and (2) That no optical energy is subtracted from the reflected beams by absorption or scattering processes in the $n_2$ layer.

However there are situations in which one or the other of these conditions fail to hold. Most of these situations arise when special materials such as dyes, suspended particles, surfactants, etc. are present. In some of these cases the set of A-matrices that model the mosaic-coverage case will not fit the data. The system must recognize this and either try an alternative model embodied in another set of A-matrices, or else return a "Failure to Identify" message.

Figure 8A:
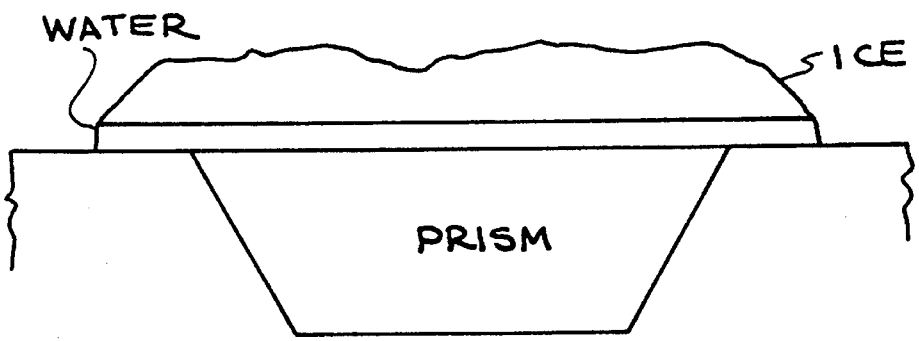
FIGS. 8A, B illustrate special conditions of thin layer of water under ice and thin layer of water plus surfactant, respectively.

One possible complex-coverage case, involving a thin film, can occur when a thin layer of water (or anti-icing fluid) separates the prism surface and a layer of ice, as in FIG. 8A. For example, water has previously covered the prism surface and frozen solidly to it. Later, partial melting occurs, starting at the inner surface of the ice. Possibly bright sunlight passes through the ice and heats the prism to above the ice melting point, even while the air and outer layers of ice remain at temperatures well below freezing. Local melting occurs at the prism surface, so that water, not ice, is in direct contact with the prism. But ice is present, only a few thousandths of an inch away.

This situation can be detected by employing A-matrices that are appropriate to the multiple-reflection optical situation described above. The columns making up the A-matrix no longer correspond in a one-to-one manner with the substances air, ice, water, etc. There is also a different algebraic relation that applies to the resulting $\vec{X}=A^{-1}\vec{R}$ and which measures the degree to which the ice-over-water model fits the data vector $\vec{R}$.

Figure 8B:
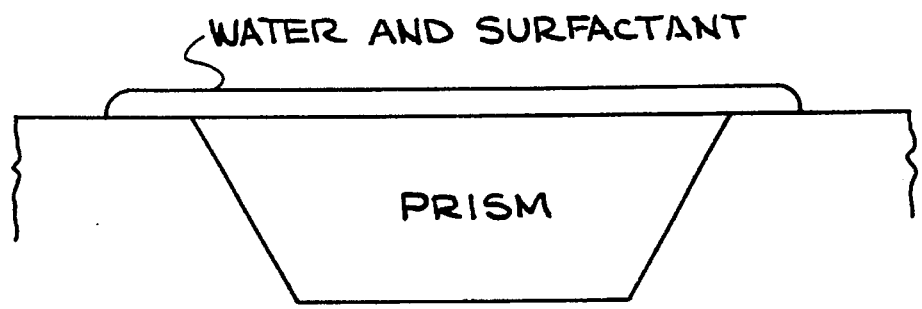

Re-entry of light refracted into the $n_2$ layer can also occur in situations where the $n_2$ layer is very thin and the $n_2$-to-air surface is a smooth plane, as in FIG. 8B. The effect is to increase the total apparent reflectance, since rays reflected at the $n_2$-to-air interface re-enter the prism and can arrive at the detector.

Such a coverage condition is not likely to occur unless rather special materials are present. Water by itself will not form such a layer because interfacial tension causes water to form thick droplets or layers with an outer surface geometry that does not tend to reflect refracted light back into the system. The presence of surfactants, however, such as are included in some anti-icing fluids, can cause a very thin film of surfactant solution to spread out over the surface of the prism with an air interface that will reflect light back into the system. The reflectance vector $\vec{R}$ produced in this case is one where all three components are very nearly equal in magnitude and only slightly smaller than 1. Detection as "contamination" is possible. It is also possible to construct A-matrices that specifically model thin-layer secondary reflection and can detect it and even measure the $n_2$-value of the layer. But this thin-layer phenomenon may not be especially serious in any case, since:

(1) A very small amount of material is involved and its detection may not be practically important, and (2) If this layer should happen to freeze, a phase separation will generally occur in which ice crystals separate from the liquid phase which will then give a reflectance signature detectable as ice.

Contaminants, which might include dyes or other optically absorptive solutes, might also be present in a fluid layer at the prism surface, as well as suspended solid materials such as mud or dirt.

Laboratory experiments show that such materials lower the effective total reflectance at the prism/$n_2$ interface. This is not surprising since, even in the case of total internal reflectance there will be energy loss via absorption from the so-called "evanescent wave" that penetrates a few wavelengths into $n_2$. However, this effect does not seem to be very strong and the mosaic-coverage A-matrices are able to accomplish a correct analysis. The contaminant perturbs the $\vec{R}$ data vector by reducing its magnitude, without much changing its "direction" in the corresponding three dimensional "space". Thus the $\vec{X}=A^{-1}\vec{R}$ computation, with standard mosaic-coverage A-matrices, return an $\vec{X}$ having $X_i$ values lower than in the corresponding contaminant-free case. It is easy to correct the measured reflectance vector for this kind of perturbation, providing, of course, that the reflectances are not reduced too much by the contaminant.

Changes and modifications in the specifically described embodiments can be carried out without departing from the scope of the inveniton which is intended to be limited only by the scope of the appended claims.

I claim:

1. A method for detecting the presence of chemical species in an environment, comprising:

positioning an optical element in the environment, the optical element having a surface which forms a reflective/refractive interface with the environment;

directing a plurality of beams in sequence internally onto said surface, each beam having a different angle of incidence on said surface;

detecting each of said plurality of beams which have been totally internally reflected at said surface;

computing the refractive index of the chemical species from the detected totally internally reflected beams;

determining the presence of the chemical species from the computed refractive index.

2. The method of claim 1 wherein the different angles of incidence of the plurality of beams are chosen on the basis of the refractive indexes of the chemical species to be detected.

3. The method of claim 1 wherein the refractive index is computed from the Fresnel equations.

4. The method of claim 1 wherein the plurality of beams comprises three beams.

5. The method of claim 1 wherein the optical element is embedded in a surface of an object in the environment.

6. The method of claim 5 wherein the surface in which the optical element is embedded is an aircraft wing.

7. The method of claim 1 further comprising detecting partial coverage when the calculated refractive indexes at the different angles are different.

8. The method of claim 7 further comprising identifying the chemical species by comparing the calculated values with a look-up table.

9. The method of claim 1 further comprising sending a "failure to identify" signal when the chemical species cannot be identified.

10. The method of claim 1 further comprising detecting total coverage when the calculated refractive indexes at the different angles are the same.

11. The method of claim 1 further comprising multiplexing the light beams at a rate of hundreds of cycles per second.

12. Apparatus for detecting the presence of chemical species in an environment, comprising:

an optical element having a surface which forms a reflective/refractive interface with an environment to be monitored;

a multiplexer for directing a plurality of beams in sequence onto said surface, each beam having a different angle of incidence on said surface;

a detector for detecting each of said plurality of beams which have been internally reflected at said surface;

means for computing the refractive index of the chemical species from the detected internally reflected beams;

wherein the presence of the chemical species is determined from the computed refractive index.

13. The apparatus of claim 12 wherein the optical element is a prism.

14. The apparatus of claim 12 having three beams.

15. The apparatus of claim 12 further comprising a plurality of LED's for generating the light beams, a plurality of respective optical fibers having an input end for receiving a light beam from an LED, and a collimating lens positioned at an output end of the optical fibers for delivering a collimated light beam to the surface.

16. The apparatus of claim 15 further comprising a polarizer after the collimating lens.

17. The apparatus of claim 12 wherein the detector is a single photodetector.

18. The apparatus of claim 12 wherein the multiplexer includes a null channel wherein none of the beams are turned on and the detector measures a background signal which is subtracted from the reflected beams.

19. The apparatus of claim 12 further comprising a plurality of sample and hold circuits connected to the multiplexer for storing signals from the detector for a respective beam over multiple cycles.

20. The appartus of claim 12 further comprising a clock connected to the multiplexer and operating at a rate of hundreds of cycles per second.

21. The apparatus of claim 12 further comprising a band pass filter in front of the detector.

22. The apparatus of claim 12 further comprising means for determining whether the computed refractive indexes at the plurality of angles agree or disagree.

23. The apparatus of claim 12 further comprising an optical fiber having a first end positioned to receive the internally reflected beams, wherein the detector is positioned at a second end of the optical fiber.

* * * * *